Patented July 12, 1938

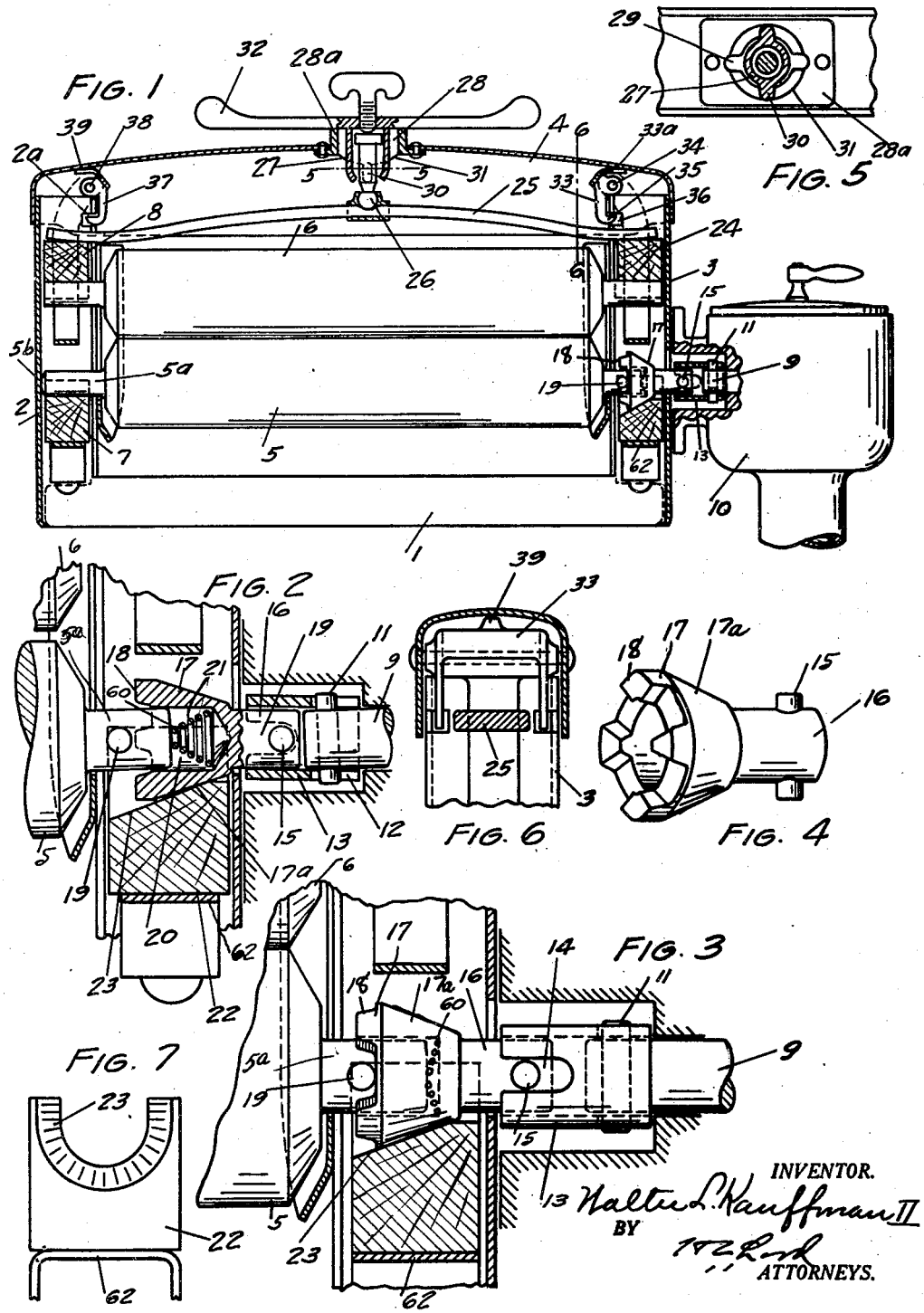

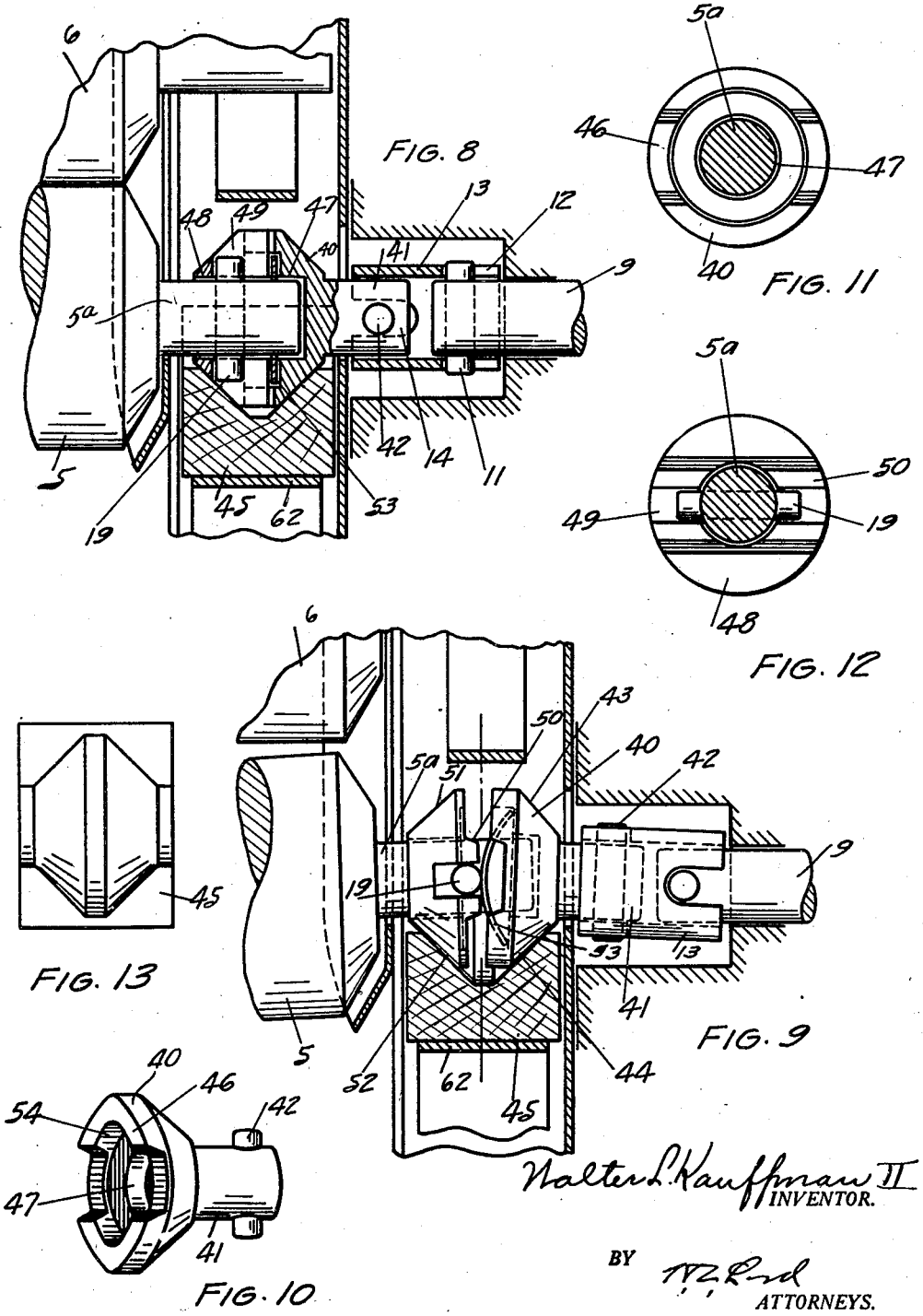

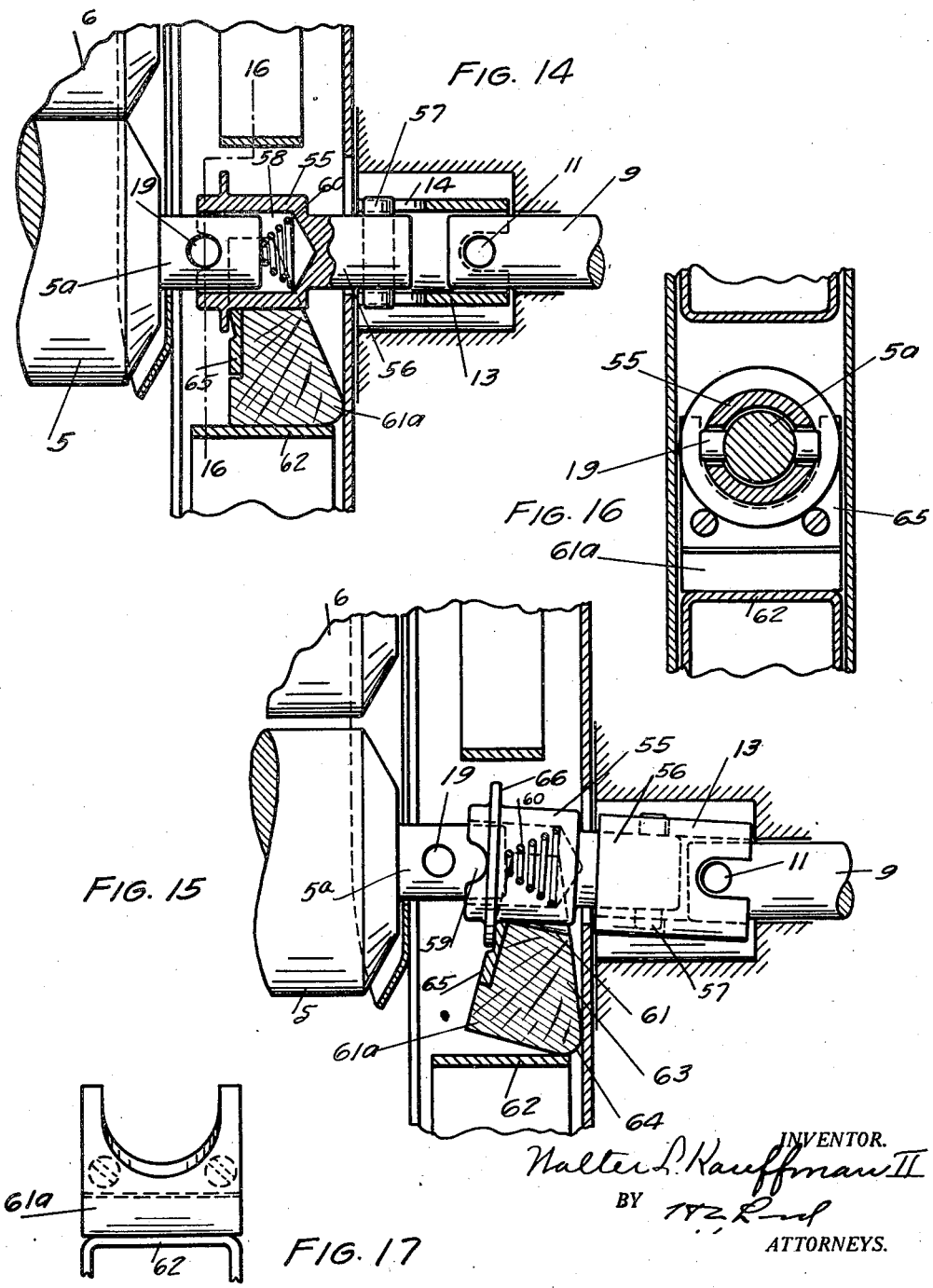

2,123,850

UNITED STATES PATENT OFFICE 2,123,850

WRINGER

Walter L. Kauffman, II, Erie, Pa., assignor to Lovell Manufacturing Company, Erie, Pa., a corporation of Pennsylvania Application July 19, 1934, Serial No. 736,007

11 Claims. (Cl. 68—253)

Heretofore it has been proposed to provide power wringers with means for breaking the driving connection to the rolls so arranged that it may be readily accomplished and act as a safety device. Some of such mechanisms have been arranged to operate in connection with a safety pressure relief device so that as a safety means there would be not only a release of pressure, but a stoppage of the rolls.

The present invention is designed to improve and simplify the mechanism for breaking the driving connection, preferably in connection with a safety release which relieves the pressure on the rolls.

In carrying out the invention I provide a means breaking the driving connection with a change in the pressure thrust on one of the rolls, ordinarily the lower drive roll. This provides a very positive mechanism for the purpose and one that may be readily housed and arranged in the frame.

Features and details of the invention will appear from the specification and claims.

Preferred embodiments of the invention are exemplified in the drawings as follows:—

Fig. 1 shows a central longitudinal section of a wringer with the invention in place therein.

Fig. 2 an enlarged sectional view of the connecting clutch with the clutch disengaged.

Fig. 3 a similar view, partly in section, with the clutch in engaged position.

Fig. 4 a perspective view of a clutch fitting.

Fig. 5 a section on the line 5—5 in Fig. 1.

Fig. 6 a section on the line 6—6 in Fig. 1.

Fig. 7 an end view of one of the bottom bearing blocks.

Fig. 8 an enlarged sectional view of a modification of the clutch mechanism with the clutch in engagement.

Fig. 9 a similar view with the clutch released.

Fig. 10 a detached view of a clutch fitting in perspective.

Fig. 11 an end view of one of the clutch fittings.

Fig. 12 an end view of a companion clutch fitting.

Fig. 13 a top view of one of the bottom bearing blocks.

Fig. 14 an enlarged section of a modified clutch mechanism with the clutch in engaged position.

Fig. 15 a similar view with the clutch in disengaged position.

Fig. 16 a section on the line 16—16 in Fig. 14.

Fig. 17 a side view of the bottom bearing block.

In the construction shown in Figs. 1 to 7, I marks the base of the frame, 2 one of the side stiles, 3 the side stile at the driving side of the wringer, 4 the top bar, 5 the bottom roll, 6 the upper roll, 7 the lower bearing at the end of the bottom roll away from the driving end, and 8 the bearing block for the upper roll at the same end of the wringer. 9 represents the drive shaft which is driven from a gear box 10 in the usual manner. The shaft 9 is provided with a cross pin 11, the ends of which extend into slots 12 in a drive sleeve 13. The drive sleeve 13 has a slot 14 and a cross pin 15 operates in this slot, the cross pin being arranged in a shank 16 of a clutch fitting 17. The clutch fitting is provided with clutch detents 18 which are adapted to engage a cross pin 19 in the lower roll shaft 5a. The fitting 17 has a central bore 20 adapted to receive the end of the shaft 5a and a spring 21 is arranged in this bore between the base of the bore and the end of the shaft 5a and tends to move the fitting out of engagement with the pin 19. The fitting 17 has a conical outer surface 17a and this operates in a conical bearing surface 23 in the bearing block 22. The roll 6 at the power end of the wringer has a sliding bearing block 24 and a pressure spring 25 operates on the bearing blocks 8 and 24. A pressure pin 26 has a connection with the spring and extends into a release sleeve 27. The release sleeve extends through an opening 28 in a release fitting 28a secured on the top bar. The fitting 28a has radial slots 29 which are adapted to receive stop shoulders 30 on the sleeve. Cam surfaces 31 are arranged on the bottom of the fitting 28a and the sleeve is provided with a handle 32. When the sleeve is turned by means of the handle, the shoulder 30 is moved off the flat between the cams 31 and as the sleeve swings the shoulders 30 reach the slots 29 and allow the sleeve to move outwardly and thus release pressure on the spring. This mechanism in function corresponds to the reissue patent to Misner, No. 15,865.

The top bar at the power end of the cylinder is provided with a latch 33 which is pivotally mounted on the top bar by means of a pin 34. The latch has hooks 35 which engage notches 36 in the face of the side stile. The opposite end of the wringer has a similar latch 37 mounted on a pin 38 and this latch engages in a notch 2a in the side stile. The upper end of the latch has an extension 39 limiting its movement.

When the spring 25 is released by the operation of the release mechanism the up-throw of the spring strikes the latches 33 and 37 at the cross member of the latch as 33a and releases the latches, thus releasing the top bar. This retarded release of the top bar is found in the Schuda Patent No. 1,709,098.

When the pressure on the roll 5 is relieved through the release of the upper roll, the spring 21 forces the fitting 17 toward the right (see Fig. 2), thus disengaging the detents 18 from the pin 19 and breaking the driving connection so that the lower roll is immediately stopped. When pressure is again exerted on the bottom roll through a re-setting of the wringer, the downward pressure on the shaft 5a which is communicated to the fitting 17 urges this fitting downwardly and it through its camming action on the cone surfaces moves the fitting toward the left re-engaging the fitting 17 with the shaft 5a and thus placing the wringer in operative position. This action of the fitting is more readily accomplished because as soon as the power rotates this fitting a very slight camming action tends to force it sidewise so as to set the clutch. The side thrust on the shaft 5a, due to the camming action of the fitting, is received by the end 5b of the shaft 5a against the outer wall of the stile 2.

It will be noted that this mechanism is very rugged, can be readily housed in the side stile, and the thrust force is ample to engage the clutch and maintain the engagement and it also responds without any complicated mechanism to the release of pressure as where a safety release is operated. The sleeve 13 permits the slight lifting of the fitting as it is released.

In the modification shown in Figs. 8 to 13, the wringer rolls with the several parts thereof including the top bar, release device and bearings, except the one bearing at the power shaft, are similar to the modification shown in Fig. 1 and have the same driving shaft, sleeve and connection.

A fitting 40 has an extension 41 with a cross pin 42 which engages the slot 14 in the drive sleeve 13. The fitting 40 has a conical rear surface 43 and this operates in a conical surface 44 in a bearing block 45. The fitting 40 has a detent clutch end 46, clearly shown in Fig. 10. The end of the shaft 5a extends into a socket 47 in the fitting 40.

A companion fitting 48 is slidingly mounted on the shaft 5a and is provided with slots 49 which are adapted to engage with the cross pin 19 and has a detent end 50 which is adapted to engage the detent end 46. The fitting 48 has a conical rear surface 51 which operates in a conical surface 52 in the bearing 45 being opposed to the conical surface 44. An annular spring washer 53 curved cylindrically with the axis of the cylindrical surface extending crosswise of the axis of the washer is arranged within a socket 54 in the fitting 40 and tends to crowd the fittings 40 and 48 apart so as to disengage the detent ends thereof. When the pressure is on the lower roll this thrust exerted on the cone bearing surfaces of the fittings 40 and 48 forces them together and the detent surfaces into engagement and so long as the pressure remains the clutch remains engaged. When pressure is released the spring washer 53 forces the fittings apart and disengages the clutch. In this structure the end thrusts, due to the camming action, are neutralized.

In Figs. 14 to 17 a further modification is shown in the clutch mechanism. Here a fitting 55 is provided with an extension 56 having a cross pin 57 engaging the connecting sleeve 13. The fitting has a socket 58 which receives the end of the shaft 5a. A notched end 59 is arranged on the end of the fitting 55 which is adapted to engage the cross pin 19. A spring 60 is arranged in the socket 58 and exerts side thrust between the fitting and the shaft 5a. The fitting operates in a bearing groove 61 in a bearing block 61a. The block rests on a support 62 in the side stile. The power side of the block is cut away at 63 permitting the block to rock on the corner 64. The front face of the block is provided with a wearing plate 65 which engages a flange 66 on the fitting 55. When pressure is exerted on the shaft 5a its thrust forces the bearing block downwardly into the position shown in Fig. 14, the block rocking on the corner 64 and this moves the upper inner face of the block to the left carrying with it, through its action on the flange 66, the fitting 55, thus moving the notched end of the fitting 55 into engagement with the cross pin and completing the driving connection. When the shaft 5a is relieved of pressure the spring 60 moves the fitting 55 to the left, rocking the block 61a and at the same time breaks the connection with the roll shaft. In this structure the same release mechanisms and other features shown in Fig. 1 may be used and when the release device is operated, thus taking the pressure off the lower roll the driving connection is broken and when the wringer is re-set and pressure exerted on the lower roll the clutch is re-set and the wringer is ready for operation without further attention by the operator.

It will be observed that in each of the structures the driving elements are so inclined that if the pressure is taken off the rolls the driving torque itself will break the connection. Thus in the structure shown in Figs. 1 to 7 the sides of the teeth 18 are slightly inclined so that the torque action on the pin 19 is sufficient to break the connection.

The same condition exists in the structure shown in Figs. 8 to 10. The driving clutch faces on the clutch end 46 are inclined so that operating on the pins 19 the clutch is disengaged by the torque action when the pressure is released.

In the same manner the walls of the driving notch 59 in the structure shown in Fig. 14 operating on the pin 19 are such as to assure a breaking of the clutch connection through the torque action. In all of these cases an added spring is preferable as giving a more definite release.

What I claim as new is:—

1. In a wringer, the combination of a frame; rolls mounted in the frame; driving means; a pressure means for the rolls; a clutch between the driving means and one of the rolls; devices responsive to pressure differences on the rolls for actuating the clutch to release the clutch with a release of pressure; and a safety release device for releasing the pressure on the rolls.

2. In a wringer, the combination of a frame; rolls mounted in the frame; a pressure device exerting and releasing pressure on the rolls; a driving means; a clutch connection between the driving means and one of the rolls comprising companion fittings, each having cone surfaces and opposing surfaces, one fitting being locked with the roll and the other with the driving means; and a double cam bearing surface on which the fittings operate, said cam surface actuating the fittings in response to and release of pressure to control the clutch surfaces.

3. In a wringer, the combination of a wringer frame; rolls having roll shafts mounted in the frame; a pressure device for the rolls; a driving means; a driving connection between the means and one of the rolls; and a tilting bearing for one of the shafts, said bearing having a frame support offset from a point of engagement by the shaft and adapted to tilt in response to a change of pressure on the shaft and through the tilting to move the connection axially under pressure to control the engagement of the driving connection.

4. In a wringer, the combination of a frame; rolls having roll shafts mounted in the frame; a pressure device for exerting and releasing pressure on the rolls; a driving means; a driving connection between the driving means and one of the rolls; and a tilting bearing receiving the pressure thrust of a roll having a frame support offset from a point of engagement of the shaft with the bearing and tilting under such thrust and release thereof and adapted to control the driving connection as it is tilted.

5. In a wringer, the combination of a frame; rolls mounted in the frame; driving means for one of the rolls; pressure means applying pressure to the rolls; a shaft for one of the rolls extending beyond the end of the roll; a bearing receiving the outer periphery of the shaft sustaining the thrust of the pressure means on the rolls; means responding to pressure communicated from the shaft to the bearing controlling the driving means; and a device for relieving pressure on the rolls.

6. In a wringer, the combination of a frame; rolls mounted in the frame; pressure means for the rolls; a bearing for one of the rolls subjected to pressure from the pressure means; a driving means for one of the rolls; a driving connection leading from the driving means to the roll driven thereby; mechanism comprising cam surfaces subjected to the roll pressure, said cam surfaces being inclined to the direction of thrust and through the camming action of the cam adapted to actuate the connection in response to a difference in pressure on the bearing; and devices releasing the pressure of the pressure means.

7. In a wringer, the combination of a frame; rolls mounted in the frame; a pressure device for the rolls; a safety release device for releasing pressure on the rolls; a driving means for one of the rolls; a bearing block for one of the rolls subjected to pressure from the pressure means and having a cam surface inclined to the direction of pressure on the rolls; a bearing fitting supported on the cam bearing surface and tending to move axially under said pressure; and a clutch setting and releasing the driving means actuated by the fitting through its camming action on its bearing surface in response to pressure differences exerted on the bearing block from the pressure device.

8. In a wringer, the combination of a frame; wringer rolls mounted in the frame; a pressure device exerting pressure on the rolls; a driving means for one of the rolls; a fitting receiving pressure thrust on one of the rolls from the pressure device; a cam surface on which the fitting operates; said cam surface being inclined to move the fitting axially under pressure from the roll; a clutch actuated by the fitting through the camming action in response to pressure differences on the fitting; and means for releasing the pressure of the pressure device.

9. In a wringer, the combination of a frame; rolls mounted in the frame; a pressure device exerting pressure on the rolls; a driving means; a clutch connection between the driving means and one of the rolls comprising companion fittings, each having cone surfaces and opposing surfaces, one fitting being locked with the roll and the other with the driving means; and a double cam bearing surface on which the fittings operate, said cam surface actuating the fittings under pressure to set the clutch as pressure is exerted and to release the same as pressure is released; and means for releasing the pressure of the pressure device.

10. In a wringer, the combination of a wringer frame; rolls having roll shafts mounted in the frame; a pressure device for the rolls; a driving means; a driving connection between the means and one of the rolls; and a tilting bearing for one of the shafts, said bearing having a frame support offset from a point of engagement by the shaft and adapted to tilt in response to a change of pressure on the shaft, and through the tilting to move the connection axially under pressure to set the connection in driving engagement under pressure as pressure is exerted, and to release the engagement as pressure is released; and a release device releasing the pressure of the pressure device.

11. A roll wringer mechanism including a frame, a pair of rolls therein adapted to be pressed together; means for pressing the rolls together and releasing the pressure; a clutch mechanism having a driven element and a clutch element capable of connecting said driven element and an associated roll, and means setting said clutch in response to normal roll pressure on the rolls and releasing said clutch on a release of the roll pressure.

WALTER L. KAUFFMAN II.